United States Patent
Ehrstrom et al.

(10) Patent No.: US 8,420,226 B2
(45) Date of Patent: Apr. 16, 2013

(54) WELDED STRUCTURAL MEMBER AND METHOD AND USE THEREOF

(75) Inventors: Jean-Christophe Ehrstrom, Echirolles (FR); Henri Gérard, Claix (FR)

(73) Assignee: Constellium France, Courbevoie (FR)

( * ) Notice: Subject to any disclaimer, the term of this patent is extended or adjusted under 35 U.S.C. 154(b) by 1356 days.

(21) Appl. No.: 11/224,995

(22) Filed: Sep. 14, 2005

(65) Prior Publication Data

US 2006/0054666 A1   Mar. 16, 2006

Related U.S. Application Data

(60) Provisional application No. 60/609,270, filed on Sep. 14, 2004.

(51) Int. Cl.
| | |
|---|---|
| B32B 15/01 | (2006.01) |
| B32B 15/20 | (2006.01) |
| B23K 20/12 | (2006.01) |
| B23K 20/24 | (2006.01) |

(52) U.S. Cl.
USPC ........ 428/654; 428/212; 228/112.1; 228/227; 228/231; 228/232; 228/262.5

(58) Field of Classification Search .................. None
See application file for complete search history.

(56) References Cited

U.S. PATENT DOCUMENTS

| | | | |
|---|---|---|---|
| 2,800,709 A | 7/1957 | Gaul | |
| 3,603,498 A * | 9/1971 | Cook et al. ..................... 228/4.1 |
| 4,078,712 A * | 3/1978 | Cook et al. .................... 228/170 |
| 4,426,429 A | 1/1984 | Di Russo et al. | |
| 6,168,067 B1 | 1/2001 | Waldron et al. | |
| 6,528,183 B2 * | 3/2003 | Dif et al. ....................... 428/654 |
| 6,769,595 B2 * | 8/2004 | Stol et al. .................... 228/112.1 |
| 6,780,525 B2 | 8/2004 | Litwinski | |
| 6,802,444 B1 | 10/2004 | Petter et al. | |
| 6,848,233 B1 * | 2/2005 | Haszler et al. ............. 52/783.17 |
| 2001/0052561 A1 * | 12/2001 | Wollaston et al. ............ 244/132 |
| 2004/0056075 A1 | 3/2004 | Gheorghe | |
| 2005/0011932 A1 * | 1/2005 | Ehrstrom et al. .......... 228/112.1 |
| 2006/0118213 A1 * | 6/2006 | Eberl et al. ..................... 148/535 |
| 2007/0246137 A1 * | 10/2007 | Lequeu et al. ................. 148/693 |

FOREIGN PATENT DOCUMENTS

| | | |
|---|---|---|
| EP | 0995511 | 4/2000 |
| EP | 1 149 656 | 10/2001 |
| JP | 2000237882 | 9/2000 |
| WO | WO 98/58759 | 12/1998 |
| WO | WO 98/58769 | 12/1998 |
| WO | WO 2004/104258 | 12/2004 |

* cited by examiner

*Primary Examiner* — Jennifer McNeil
*Assistant Examiner* — Jason L Savage
(74) *Attorney, Agent, or Firm* — Baker Donelson Bearman Caldwell & Berkowitz, PC

(57) ABSTRACT

A structural member comprising at least two aluminum alloy parts displaying different property balances, said at least two parts being welded and wherein one of said parts either is (i) selected from an aluminum alloy different from the other of said at least two parts and/or (ii) is selected from an initial temper different from the other of said at least two parts, and wherein at least one of said at least two parts has been pre-aged prior to being welded, and, wherein said structural member has undergone a post-welding thermal treatment conferring a final temper to each of said at least two parts. The parts are advantageously welded by friction stir welding. Another subject of the invention is a method for manufacturing a structural member.

37 Claims, 5 Drawing Sheets

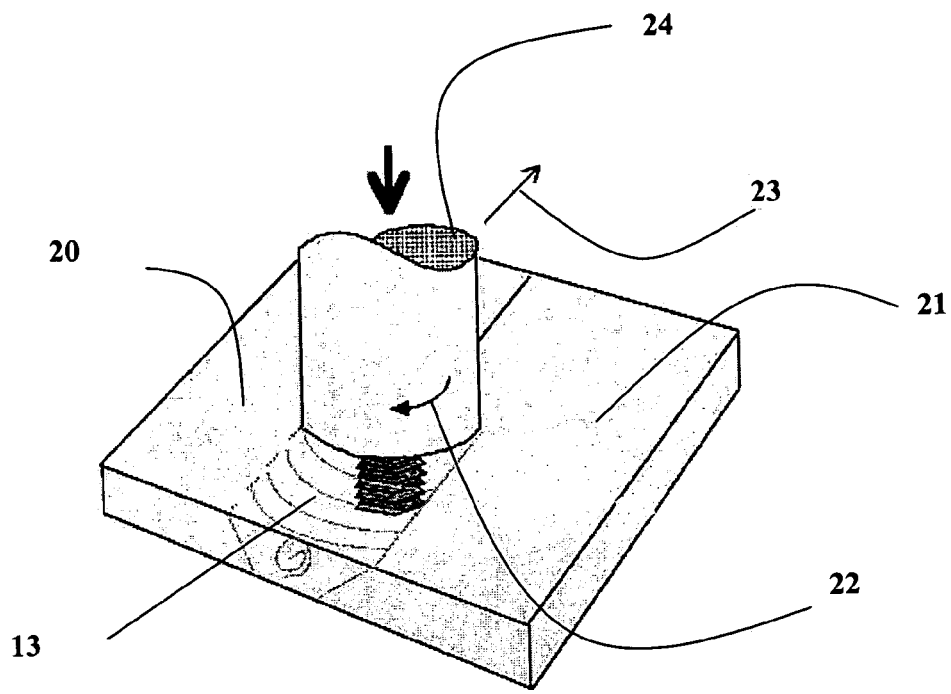
Fig. 4
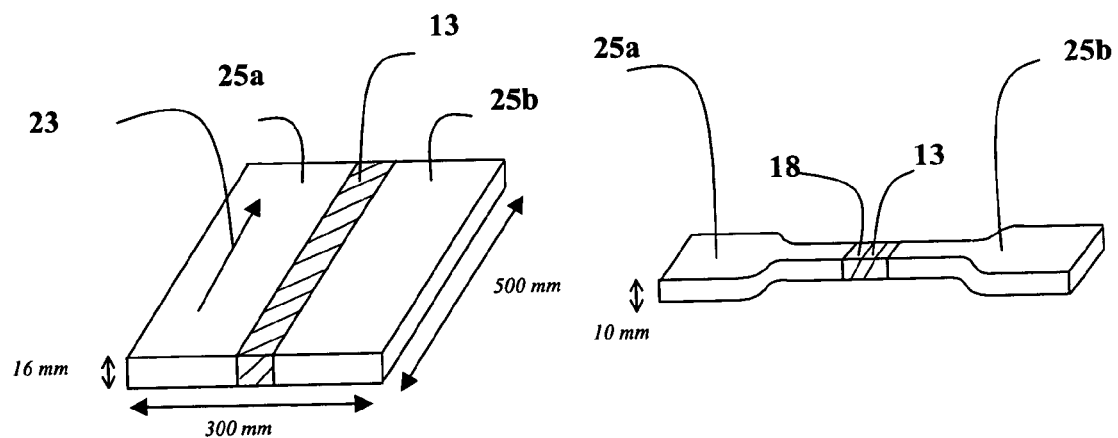
Fig 5
Fig 6

WELDED STRUCTURAL MEMBER AND METHOD AND USE THEREOF

CROSS REFERENCE TO RELATED APPLICATION

This application claims priority to U.S. Provisional Application No. 60/609,270, filed Sep. 14, 2004, the content of which is incorporated herein by reference in its entirety.

BACKGROUND OF THE INVENTION

1. Field of the Invention

The present invention relates generally to welded aluminium alloy members and more particularly to a welded structural member comprising two or more parts of different alloys and/or tempers. These structural members may be used, for example, in aircraft construction.

2. Description of Related Art

It is generally known that when manufacturing semi-finished products and structural elements for aeronautical construction, certain required properties generally cannot be optimized at the same time independently of one another. This is sometimes the case with respect to "static mechanical properties" (particularly the ultimate tensile strength UTS and the yield stress YS), on the one hand, and properties relating to "damage tolerance" (particularly toughness and resistance to fatigue crack propagation) on the other hand. For each contemplated use of a structural element, a proper balance between static mechanical properties and damage tolerance properties needs to be defined. This is known as "property balance". Additional properties, such as corrosion resistance, can also be included in the property balance, as required, and in some cases, it may even be necessary to define a balance of two or more properties within the static mechanical properties or within the damage tolerance properties, such as yield strength and elongation which tend to be conflicting. The need for optimizing the property balance is particularly strong with respect to parts or structural members where the best results are obtained when static mechanical properties are optimized on one geometric end and damage tolerance is optimized on the other geometric end. Typically, top skin covers are optimized for static mechanical properties and bottom skin covers are optimized for damage tolerance. During the past few years, new alloys have been developed for top and bottom skin panels and the difference of properties between the panels is getting more and more pronounced. In spars, which are connected to both the top skin panel and the bottom skin panel, it would be of great interest to optimize the upper part for static mechanical properties and the bottom part for damage tolerance. However, since spars are made from one alloy in one temper for unwelded integral structures, a choice has to be made as to which properties to optimize. Currently 7040 in T76 or T74 temper is typically chosen to take advantage of the best compromise between the yield stress and toughness offered by this alloy. In order to separately optimize the upper and lower part of, for example, a spar, it has been proposed to manufacture the spar from two different materials. A mechanically fastened structure can be made, but is expensive. It has been proposed to join the structure by welding.

Among welding techniques, two main families may be distinguished. In fusion welding processes, such as resistance spot welding, flash butt welding, laser welding, and arc welding electron-beam welding, the weld is made in the liquid phase above the melting point. In friction welding, where relative movement of the parts to be welded generates heat for joining and in friction stir welding, where a non-consumable rotating tool moves along the joint between two components to generate heat for joining, the weld is made below the melting point, in the solid phase.

Whatever welding technique is used, heat is generated and welding has usually a detrimental effect on the properties of the different materials by decreasing strength in the weld as well as in the zone adjacent to the weld referred to herein as the "heat-affected zone". However, fusion welding techniques do behave differently and many alloys, such as most 2XXX and 7XXX aluminium alloys series, that cannot be welded reliably by fusion welding techniques, may be joined by friction welding or friction stir welding.

WO 98/58759 (British Aerospace) discloses a method for forming airframe components by joining two components by friction stir welding. Structural airframe components such as wing skin panels, wing spars, and wing skin-spar-ribs may be obtained with the method in this patent application. Hybrid billets of aluminium alloys comprising for example a 7000 series alloy friction stir butt welded to 2000 series, are described. However, no indication is provided in this patent application on how to solve the metallurgical difficulties associated with friction stir welding of age-hardenable aluminium alloys. In particular, the low strength and low corrosion resistance of the heat-affected zone are not discussed.

U.S. Pat. No. 6,168,067 (McDonnell Douglas Corporation) teaches a method to reduce material property degradation during friction stir welding. In particular, the friction stir welding operation is carried out after solution heat treating and quenching and before aging. Aluminium-zinc alloys are not mentioned as examples of binary or ternary alloys useful for the invention. The patent does not mention the possibility of joining different alloys or members from the same alloy in different tempers. The thermomechanical treatment carried out before joining is the same for both pieces to be joined. Aging before joining the pieces by friction stir welding is not mentioned, and the structural members are in a non-equilibrium state during the friction stir welding operation.

EP 0 995 511 (Alcoa) describes how to join layered materials before a combined deformation. The means for attaching the materials is directed to maintain the positioning upon combined deformation, which is a different objective from the present invention.

U.S. 2004/0056075 (Universal Alloys) describes a method to improve strength properties in the heat-affected zone and in the weld zone. The precipitation hardenable aluminum alloy members to be welded are subjected to the following steps: a first aging step, a welding step and a second aging step. The members to be joined are made of the same aluminium alloy and undergo the same first aging treatment before welding. This patent application does not address the particular problems related with joining members of different alloys or members from the same alloy in different tempers In U.S. Pat. No. 6,802,444 (NASA), a solution to improve the heat treatment of friction stir welding materials is proposed. An aluminium-zinc alloy is first heat treated, then air cooled to room temperature, then assembled by friction stir welding, then solution heat treated for a second time, then quenched and finally aged.

In JP 2000-237882 (Sky Aluminium), friction stir welding is used to join super-plastic aluminium alloys such as an Al—Mg alloy, an Al—Zn—Mg alloy, an Al—Zn—Mg—Cu alloy, an Al—Cu alloy, an Al—Li alloy, an Al—Mg—Si alloy, and an Al—Si alloy. These alloys have a limited grain size, preferably <=30 μm. The heat treatments carried out are specific to super-plastic aluminium alloys.

There is clearly a need for a method capable of providing a solution to the problem, (referred to hereafter as "the problem"), of welding two or more aluminium alloy parts displaying different property balances without significantly damaging properties of the aluminium alloy parts such as static mechanical properties and/or damage tolerance and/or corrosion resistance in the weld, in the heat-affected zone and/or in zones that are not affected by welding.

SUMMARY OF THE INVENTION

A purpose of the invention was to obtain a structural member comprising at least two aluminum alloy parts displaying different property balances. The aluminum alloy parts are joined by welding. In order to avoid damaging the properties of aluminium alloy parts, one of at least two parts is pre-aged prior to being welded, and, the structural member comprising the aluminum parts undergoes a post-welding thermal treatment conferring a final temper to each of the parts. In order to obtain at least two parts with different property balances, one of the at least two parts is either selected from an aluminum alloy different from the other part and/or is selected from an initial temper different from the temper of the other part.

It is another object of the present invention to provide a method for manufacturing a structural member comprising welding at least two aluminum alloy parts displaying different property balances.

Further included as part of the present invention are methods of preparation and usage of systems and treatments according to the present invention.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWINGS

FIG. 4 shows a representation of the friction stir welding process. 13 weld, 20: advancing side, 21: retreating side, 22: rotating direction, 23: welding direction, 24: tool.

FIG. 5 is a sheet welded in trial tests. 13: weld, 23: welding direction, 25a first material, 25b: second material.

FIG. 6 is a tensile specimen. 13: weld, 18: heat-affected zone, 25a: first material, 25b: second material.

DETAILED DESCRIPTION OF A PREFERRED EMBODIMENT

Unless otherwise indicated, all the indications relating to the chemical composition of the alloys are expressed as a mass percentage by weight based on the total weight of the alloy. Alloy designation is in accordance with the regulations of The Aluminium Association, known to those skilled in the art. The tempers are laid down in European standard EN 515. Unless otherwise indicated, the static mechanical characteristics, in other words the ultimate tensile strength (UTS, also designated as Rm), the tensile yield strength (YS, also designated as TYS or Rp0.2), the elongation at fracture A and the elongation at necking Ag, of the metal sheets or plates are determined by a tensile test according to standard EN 10002-1. Unless otherwise indicated, the definitions given in the European Standard EN 12258-1 apply. The term "sheet" means a rolled product not exceeding about 6 mm in thickness. "Medium plate" is a rolled product from about 6 mm to about 30 mm in thickness, and "thick plate" is a rolled product typically above about 30 mm in thickness. "Plate" includes "medium plate" and "thick plate".

Figure 1:
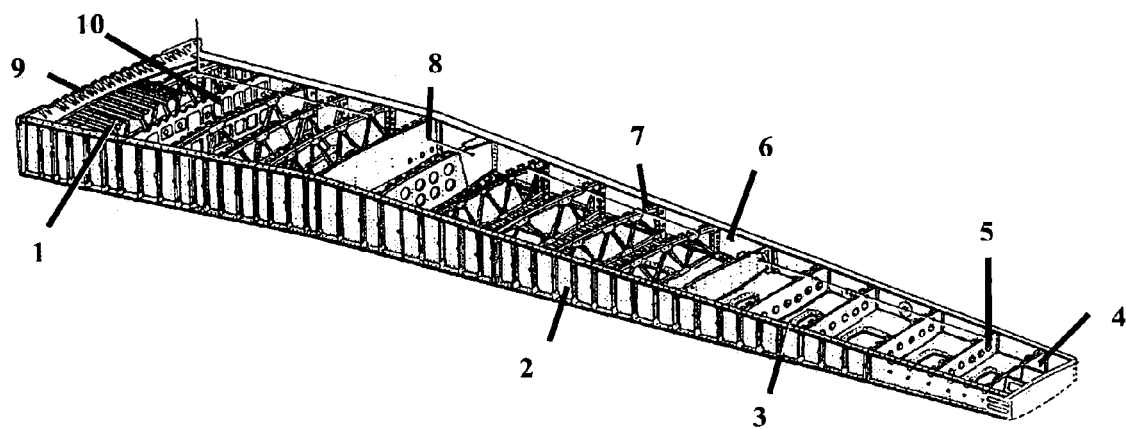
FIG. 1 shows a typical aircraft wing design. 1: Top skin panel, 2: Front spar, 3: Bottom skin panel, 4: Tank end, 5: Plate type rib, 6: Rear spar, 7: Truss rib, 8 Plate type rib, 9: Outer wing end rib, 10: Forged rib.
Figure 2:
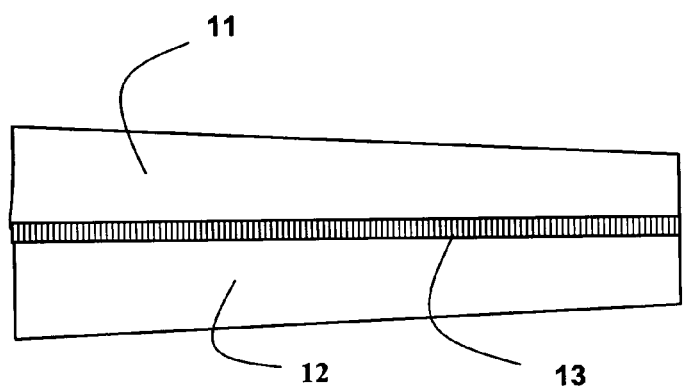
FIG. 2 shows a cross-section through a welded spar of the present invention. 11: Upper part 12: Lower part, 13: weld.

The term "structural member" refers to a component used in mechanical construction for which the static and/or dynamic mechanical characteristics are of particular importance with respect to structure performance, and for which a structure calculation is usually prescribed or undertaken. These are typically components the rupture of which may seriously endanger the safety of the mechanical construction, its users or third parties. In the case of an aircraft, structural members comprise members of the fuselage (such as fuselage skin), stringers, bulkheads, circumferential frames, wing components (such as wing skin, stringers or stiffeners, ribs, spars), empennage (such as horizontal and vertical stabilisers), floor beams, seat tracks, and doors. A typical aircraft wing structure is shown in FIG. 1.

For the purposes of the present invention, "integral structure" means the structural of part of an aircraft that was designed to achieve material continuity over the largest possible size in order to reduce the number of mechanical assembly points. An integral structure may be made either by in-depth machining, or by the use of shaped parts, for example obtained by extrusion, forging or casting, or by welding of structural members made of weldable alloys. A "mechanically fastened structure" means a structure in which the thin or thick plates are fixed depending on the destination of the structural member (for example a fuselage member or a wing member). Fixing is usually accomplished by riveting, onto stiffeners and/or frames (that can be made by machining from extruded or rolled products).

Exfoliation corrosion was determined by an EXCO type test according to ATSM G34.

According to the present invention, the problem identified supra was solved by pre-aging one of the parts to be joined to a desired temper, welding the parts with other parts to be joined and heat-treating the structural member comprising the parts to obtain an optimized final temper for each part. By carrying out an individual pre-aging and a customized final heat treatment, it is possible to minimize or even avoid loss of static mechanical properties and/or damage tolerance and/or corrosion resistance in the zone affected by welding, while at the same time, obtaining an optimized temper in zones that are not affected by welding.

A suitable structural member according to the present invention comprises at least two aluminium alloy parts displaying different property balances. The at least two parts are welded and one of the parts is either (i) selected from an aluminium alloy different from the other of the at least two parts and/or (ii) is selected from an initial temper different from the temper of the other of the at least two parts. At least one of the at least two parts is pre-aged prior to being welded and, the structural member undergoes a post-welding thermal treatment conferring a final temper to each of the at least two parts.

In one embodiment of the present invention, the at least two parts are adjacent. By adjacent, it is meant that the at least two parts have edges or sides in abutment with each other. Adjacent assemblies include, for example: side-by-side, butt joint, lap joint, top of each other, Tee-joint, edge joint, and corner joint.

In another embodiment of the invention, the different property balances between the at least two parts are achieved by virtue of at least one of (i) the chemical composition of the parts, (ii) the initial tempers of the parts, and/or (iii) the post-welding thermal treatment.

By final temper, it is meant the temper obtained after the post-welding thermal treatment. As such the final temper is the result the pre-aging and of the post welding thermal treatment. Tempers within the scope of the present invention include, but are not limited to, T tempers (thermally treated to produce tempers other than F, O or H) and even more precisely solution heat-treated and then artificially aged T6 tempers, solution heat treated and overaged/stabilised T7 tempers, and even more precisely T73, T7351, T74, T7451, T76, T7651, T77, T7751, T79 and T7951, or solution heat-treated cold worked and then artificially aged T8 and T851 tempers are of particular interest to the present invention.

By a "post-welding thermal treatment", it is meant a thermal treatment of the welded structural member. The post-welding thermal treatment should be designed so as to obtain the desired final temper of the at least two parts. The post welding thermal treatment may optionally comprise several steps at various temperatures. In an advantageous embodiment, when a 2XXX alloy is part of the assembly, a post welding treatment highest temperature can advantageously be from about 150° C. to about 200° C., and preferentially from about 170 to about 180° C. In another advantageous embodiment, when the assembly includes only 7XXX alloys, a post welding treatment highest temperature can advantageously be from about 1110° C. to about 180° C., and preferentially from about 140° C. to about 160° C. This post-welding thermal treatment allows for better compression strength of alloys not treated before welding, as well as provides better toughness and corrosion behavior compared to the alloy, which underwent a treatment prior to welding, since this pre-aged alloy is more over aged.

As stated in the description of related art, certain required properties of structural components typically are difficult to optimize at the same time independently of one another. This is particularly true for properties such as "static mechanical properties" or "strength" (particularly the ultimate strength UTS and the yield stress YS) and "damage tolerance" (particularly toughness and resistance to crack propagation).

In another embodiment of the invention, at least one part is preferably selected such that the chemical composition thereof and/or the final temper thereof imparts strength properties to the structural member. At least another adjacent part is preferably selected such that the chemical composition thereof and/or the final temper thereof provides damage tolerance to the structural member.

As far as chemical composition is concerned, the at least two aluminium alloy parts can be selected from any aluminium alloy from the same or different series, such as for example 2XXX alloys or 7XXX alloys. 2XXX alloys, which can be used for the present invention include but are not limited to 2014, 2022, 2023, 2024, 2026, 2027, 2050, 2056, 2098, 2099, 2139, 2196, 2224, 2324 and 2524. Parts in 2XXX alloys usually exhibit desirable damage tolerance properties and as such are used in parts requiring best tension properties such as wing bottom skin covers. Parts in 7XXX alloys, which can be used for the present invention include but are not limited to 7010, 7040, 7050, 7150, 7250, 7055, 7056, 7068, 7049, 7140, 7149, 7249, 7349, 7449, 7075, 7175, and 7475. Parts in 7XXX alloys typically exhibit high strength at near peak tempers and as such, are advantageously used in parts requiring the best compression qualities such as wing top skin covers. In a different temper, however, parts in 7XXX alloys can also exhibit good damage tolerance properties. In a preferred embodiment of the present invention, a 7XXX alloy part has been pre-aged before welding. In another embodiment of the present invention, a 2XXX alloy part has been pre-aged before welding.

However, strength and damage tolerance are not the only properties that are difficult to optimize simultaneously. It is also difficult to simultaneously optimize strength and resistance against stress and/or exfoliating corrosion. In another embodiment of the present invention, at least one part is selected such that the chemical composition thereof and/or the final temper thereof imparts strength to the structural member, and at least another adjacent part is selected such that the chemical composition thereof and/or the final temper thereof provides resistance against stress and/or exfoliation corrosion.

A person skilled in the art knows that resistance to stress and/or exfoliating corrosion is often related to the metallurgical temper. For example, it is described in EN515 that the stress corrosion resistance and the exfoliating corrosion resistance improve with increasing averaging, in the order T79 (and T7951), T76 (and T7651), T74 (and T7451), T73 (and T7351) with T79 (and T7951) exhibiting the worst corrosion resistance and T73 (and T7351) exhibiting the best corrosion resistance.

According to another embodiment of the present invention, there is provided a method for manufacturing a structural member comprising at least two parts. The at least two parts are optionally in different final temper, in order to obtain the best compromise of corrosion performance and strength for each part of the structural member.

Among known welding techniques such as resistance spot welding, flash butt welding, laser welding, arc welding, electron-beam welding friction welding and friction stir welding, friction stir welding is often used in an advantageous embodiment of the present invention.

Friction stir welding was initiated in the early 1990s by TWI (The Welding Institute) in the United Kingdom, and has been used in assembling aluminum alloys. A principle of friction stir welding is to obtain a weld without melting the metal, by applying strong shear to the metal using a rotating tool that stirs the two materials to be assembled. First, the yield stress is reduced by heating the metal by applying friction using a shoulder portion of the rotating tool to the metal surface, and the tool is then moved to make the weld by gradually moving it in a forward direction. The shoulder portion of the tool also contains the metal and maintains the pressure to avoid metal ejection outside the welded zone.

It is known that friction stir welding is capable of avoiding hot cracking, which in particular means that alloys that may have previously been considered as not being weldable by fusion, can now be welded. For example, magnesium containing 2XXX alloys or copper containing 7XXX alloys were previously considered not fusion weldable, but can be welded with friction stir welding techniques.

Figure 3:
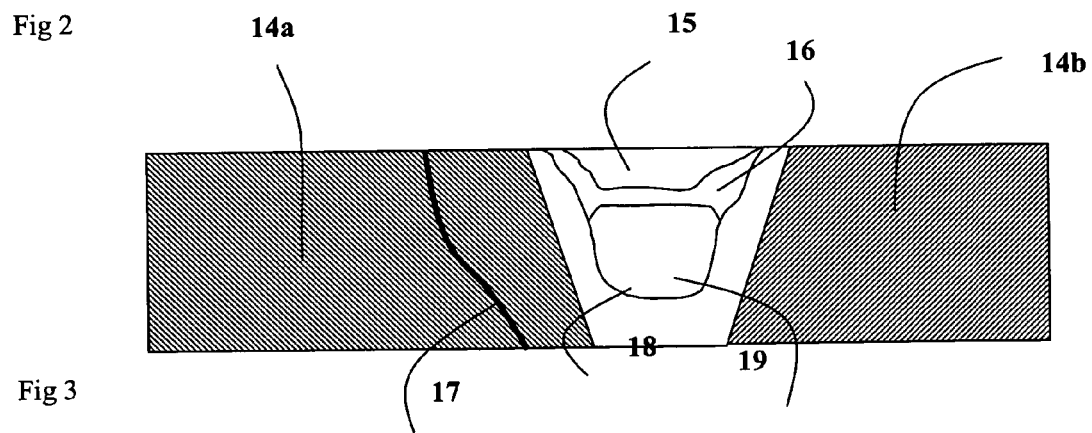
FIG. 3 shows the location of a fracture after a tensile test in a cross-section through the weld zone obtained from friction stir welding. 14a: material with the weakest yield stress, 14b: material with the highest yield stress 15: plastically deformed zone, 16: Thermo mechanically affected zone, 17: fracture, 18: heat-affected zone, 19 nugget.

It is known that the metallurgical structure inside and around the friction stir welded zone gives a very characteristic facet, which is significantly different from a facet obtained with fusion weld. Apart from zones remote from the weld that are completely unaffected, three distinct zones can be distinguished in a friction stir weld, as shown in FIG. 3:

19—the zone affected by the most severe plastic deformation is called the "nugget". During welding, the temperature can reach 560° C. in this zone. The width of the nugget is usually slightly more than the tool diameter.

16—the second zone on each side of the nugget is the thermo-mechanically affected zone, which deformed to a lesser extent and which, depending on the alloy may show signs of recrystallisation.

15—the third zone above the nugget is called the "plastically deformed zone" and is formed by the rotation effect of the tool shoulder.

18—the heat-affected zone surrounds the previous severely deformed zones and undergoes metallurgical transformations related to the increased temperature FIG. 4 describes a friction stir welding operation. The advancing side 20 is the side where the local direction of the tool surface due to tool rotation and the welding direction are in the same direction. The retreating side 21 is the side where the local direction of the tool surface due to tool rotation and the welding direction are in the opposite direction. The tool rotation speed is the speed at which the tool rotates in the rotating direction 22. The weld speed is the speed at which the tool moves along the welding direction 23. It was discovered in the present invention that the two sides are not equivalent, especially when different alloys are welded together, and that the advancing side exhibits the worst results in terms of resistance to exfoliating corrosion. In the case where a 2XXX alloy part is joined to a 7XXX alloy part, better results in terms of static mechanical properties may be obtained if the 2XXX alloy part is placed in the advancing side. In the case where a 7XXX alloy part is joined to another 7XXX alloy part with different static mechanical properties, better results may be obtained if the 7XXX alloy part with the highest ultimate tensile strength is placed in the advancing side.

Figure 7:
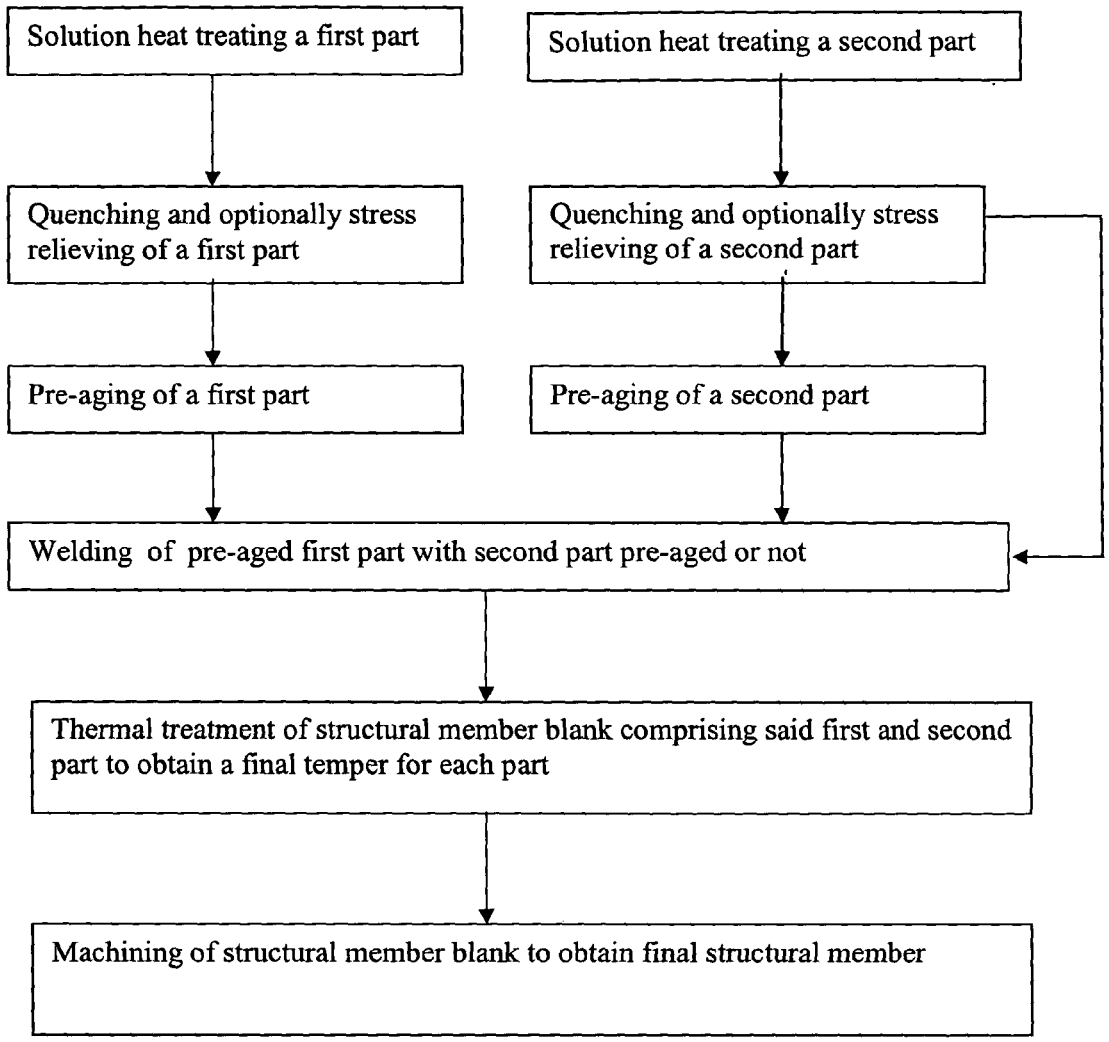
FIG. 7 is a flow chart illustrating the steps for manufacturing a structural member according to one embodiment of the present invention.
Figure 8:
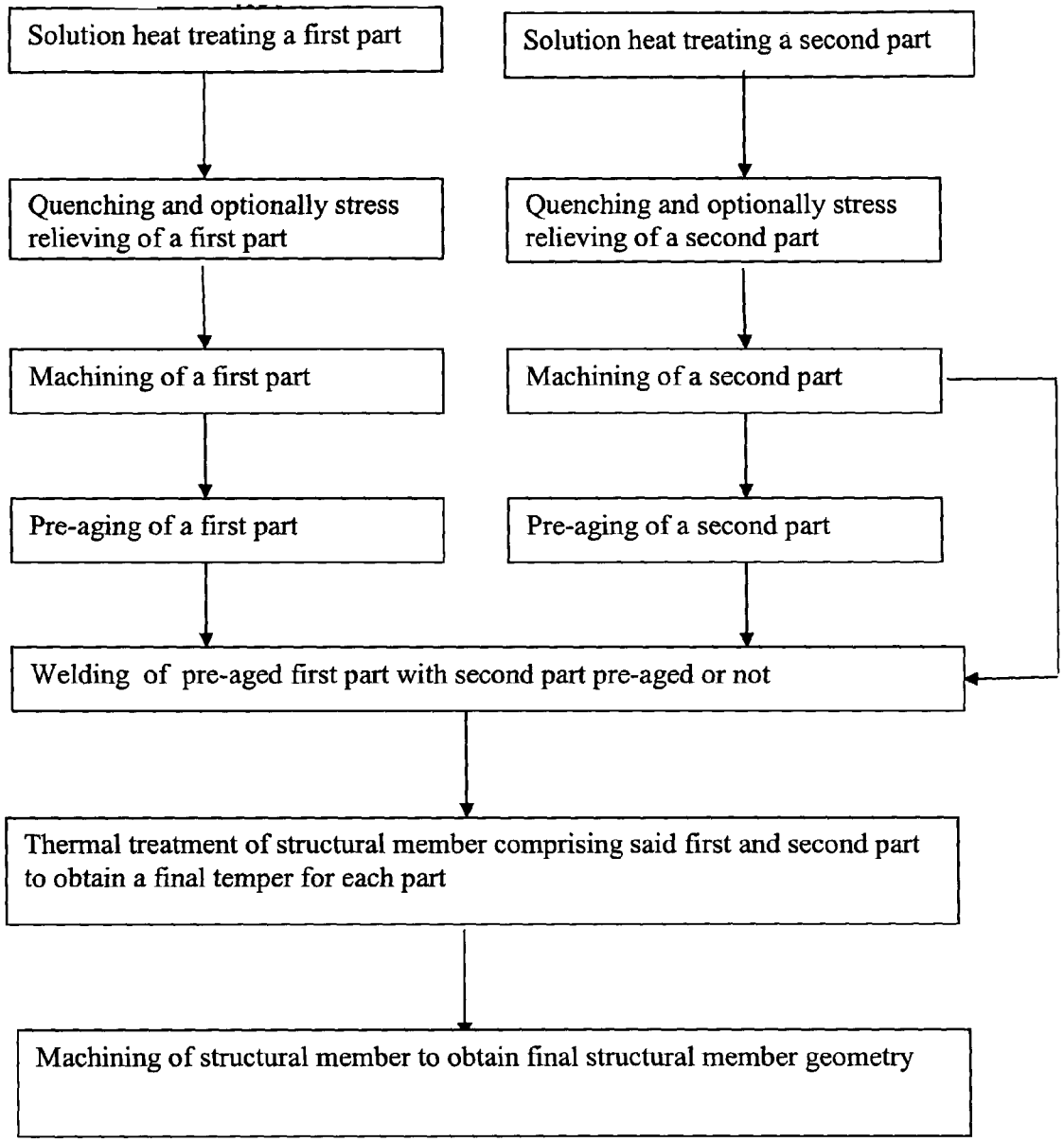
FIG. 8 is a flow chart illustrating steps for manufacturing a structural member according to one embodiment of the present invention.
Figure 9:
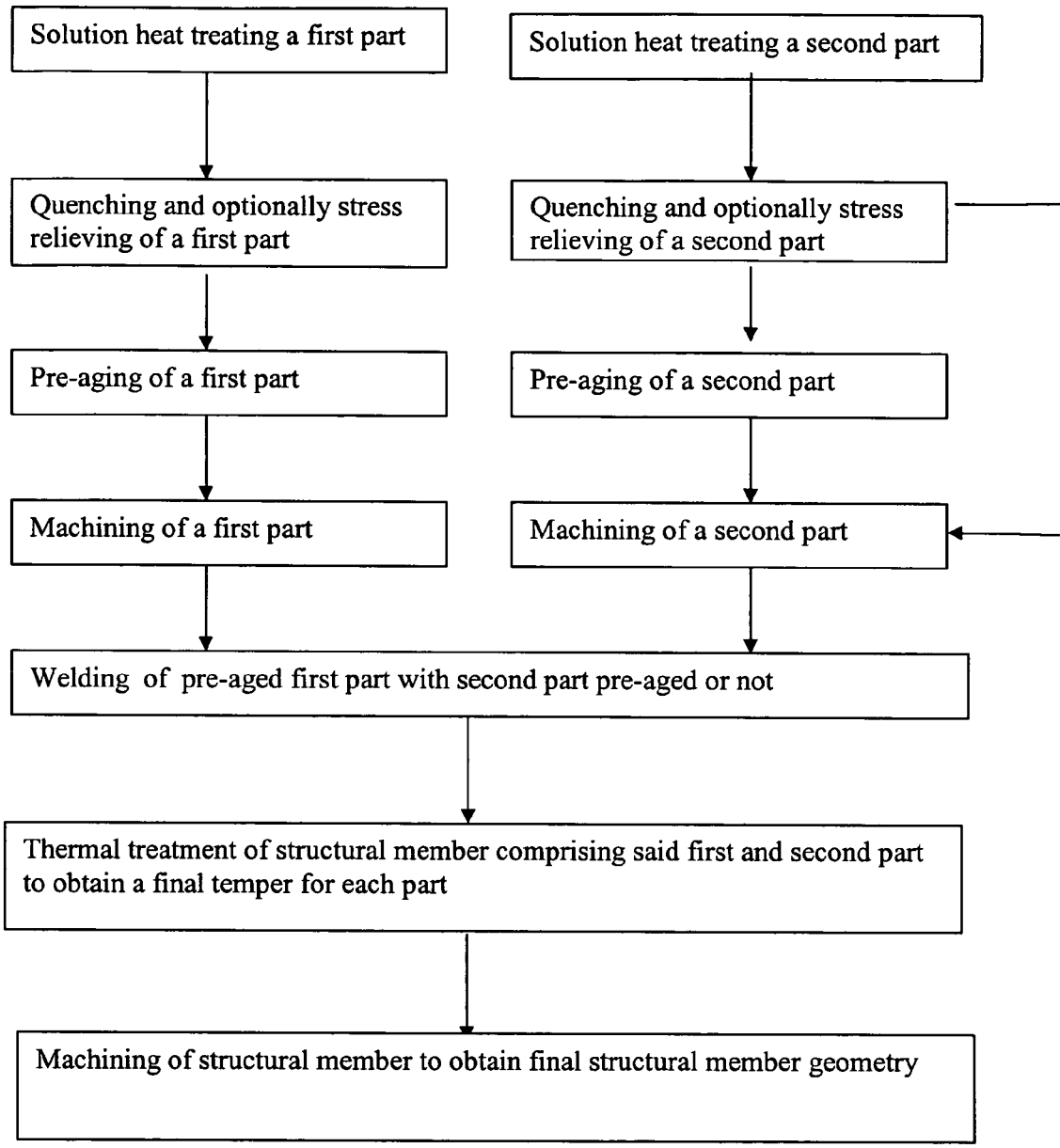
FIG. 9 is a flow chart illustrating steps for manufacturing a structural member according to one embodiment of the present invention.

Referring to FIG. 7, there is shown a sequence of steps that may be used in an embodiment of the present invention. In this embodiment, a pre-aged first part and a second part, possibly pre-aged, are welded together to form a structural assembly blank. This blank is then machined to its final shape. In another embodiment of the instant invention described in FIG. 8, a first rough machining step is carried out after quenching and optionally stretching and before pre-aging for the at least one part which is pre-aged. In yet another embodiment of the invention described in FIG. 9, a first rough machining step is carried out after pre-aging and before welding for the at least one part which is pre-aged.

In an advantageous embodiment of the present invention, the structural member is used in aircraft construction, and comprises for example, parts of the fuselage (such as fuselage skin), stringers, bulkheads, circumferential frames, wing components (such as wing skin, stringers or stiffeners, ribs, spars), empennage (such as horizontal and vertical stabilisers), floor beams, seat tracks, and/or doors. The structural assembly of ribs and spars obtained from a method of the present invention is particularly advantageous. In a preferred embodiment of the present invention, a rib or a spar includes at least an upper part and a lower part, wherein the upper part comprises 7449 T79 or 7449 T7951 and the lower part comprises 7040 T76 or 7040 T7651.

EXAMPLES

Example 1

A structural assembly was prepared comprising two parts from the same alloy with different tempers. Aluminium alloys 7449 and 7040 were cast and the composition obtained from these cast are provided in Table 1.

TABLE 1

| Chemical compositions (weight percent) | | | | | | | | |
|---|---|---|---|---|---|---|---|---|
| Element | Si | Fe | Cu | Mg | Cr | Zn | Ti | Zr |
| 7040 | 0.03 | 0.07 | 1.72 | 1.89 | 0.04 | 6.37 | 0.04 | 0.11 |
| 7449 | 0.05 | 0.07 | 1.94 | 2.15 | | 8.50 | 0.03 | 0.11 |

The ingots of 7040 were homogenized at 475° C., hot rolled down to a thickness of 100 mm, solution heat treated at 480° C., quenched and stretched of 3%. This treatment resulted in a W51 temper. The resulting plates were then cut to the desired dimensions and some of the parts obtained received a pre-aging treatment of 6 h 120° C.+16 h 155° C. resulting in a T7651 temper. A first machining step was then carried out on the W51 parts and on the T7651 parts in order to obtain 16 mm coupons ready for welding.

The ingots of 7449 were homogenised at 473° C., hot rolled down to a thickness of 18 mm, solution heat treated at 473° C., quenched and stretched of 3%. This treatment resulted in a W51 temper. The resulting plates were then cut to the desired dimensions and some of the parts obtained received a pre-aging treatment of 24 h 120° C.+17 h 150° C. resulting in a T7951 temper. A first machining step was then carried out on the W51 parts and on the T7951 parts in order to obtain 16 mm coupons ready for welding. A typical yield stress for these alloys is 600 MPa for 7449 T7951 and 500 MPa for 7040 T7651.

Friction stir welding was used as a welding method. Two parameters associated with this welding technique were varied in the trials: the relative position of the parts with regards to the rotation of the tool (advancing and retreating sides) and the weld speed. Welding was performed on an ESAB Super-Stir® Machine. Welding parameters set-up was made according to "good looking welds", in other words, a weld with no root or surface defects and good surface finish was considered to be good. All the combinations, described in Table 2, were successfully welded in spite of the disparity of flow stress at high temperatures.

Welds parameters were chosen from tests conducted in a preliminary study detailed below. All the combinations were made at 230 rpm (rotations per minute) and two welding speeds were tried: 80 and 100 mm/min. As no visual defect was observed on the surface of the welds, only the "100 mm/min" welds were characterized. This choice was made having in mind that welding with a higher speed would be good both for the mechanical properties through minimization of the heat input and for productivity.

TABLE 2

Description of assemblies and post welding thermal treatment conditions

| | Initial alloy/temper | | Post weld | Final alloy/temper | |
|---|---|---|---|---|---|
| Specimen reference | Advancing Side | Retreating Side | heat treatment | Advancing Side | Retreating Side |
| A | 7040-T7651 | 7040-W51 | 6 h 120° C. + 16 h 155° C. | 7040-T7451 | 7040-T7651 |
| B | 7449-T7951 | 7449-W51 | 24 h 120° C. + 17 h 150° C. | 7449-T7651 | 7449-T7951 |
| C | 7449-W51 | 7449-T7951 | 24 h 120° C. + 17 h 150° C. | 7449-T7951 | 7449-T7651 |

As described in Table 2, a post-weld heat treatment was applied on each combination before mechanical testing. All welds were tensile tested on specimens taken at mid thickness and perpendicular to the weld, as shown in FIGS. 5 and 6.

At least three specimens were tested for each case with good reproducibility. Strength levels obtained were close for all the combinations tested: between 350 and 385 MPa. The results are shown in Table 3.

TABLE 3

Mechanical properties of the joints

| Specimen reference | TYS (MPa) | UTS (MPa) | Ag % | A % |
|---|---|---|---|---|
| A | 270 | 365 | 2.49 | 3.80 |
| B | 290 | 383 | 2.35 | 3.03 |
| C | 288 | 379 | 2.10 | 2.68 |

It was noticeable that fracture occurred mainly but not systematically on the side where the alloy has the lowest yield strength (see FIG. 3). Effectively, 7040-T7451 yields before 7040-T7651 and 7449-T7651 often yields before 7449-T7951. The couple 7449-T7651/7449-T7951 (Advancing/Retreating) has the same behaviour as the opposite combination 7449-T7951/7449-T7651 (Advancing/Retreating).

For exfoliation corrosion evaluation, each alloy combination was immersed during 48 h in a solution prepared with de-ionized water and NaCl (234 g/l), $KNO_3$ (50 g/l) and $HNO_3$ (6.3 ml/l) and constantly kept at 25° C.±3° C. Rating was made according to ASTM G34, N standing for No attack, P for pitting, PF for exfoliation pitting, EA for exfoliation superficial, EB for exfoliation moderate, EC for exfoliation severe and ED for exfoliation very severe. Table 4 gives the quotations of EXCO tests before cleaning.

It should be noted, that an intermediate zone between the heat-affected zone and the base metal appeared after cleaning. These results show that the nugget and the base metal have a good performance in EXCO, quotations being PF in each case. As far as the heat-affected zone is concerned, EB is typically obtained except for 7449-T7651 (ED) in case B.

In the case of 7449 alloy, the position of the alloy (Advancing/Retreating) seemed to have an influence on the corrosion results. The best results were obtained when the aluminium alloy part with the lowest overaging (7449-T7951) and thus the highest mechanical properties (UTS, YS) was placed in the advancing side.

TABLE 4

EXCO test results

| Specimen reference | Advancing side | | | Retreating side | |
|---|---|---|---|---|---|
| | Base Metal | HAZ | Nugget | HAZ | Base Metal |
| A | 7040-T7451 | | | 7040-T7651 | |
| | PF | EB | PF | EB | PF |
| B | 7449-T7651 | | | 7449-T7951 | |
| | PF | ED | PF | EB | PF |
| C | 7449-T7951 | | | 7449-T7651 | |
| | PF | EB | PF | EB | PF |

Example 2

In this example, a structural assembly was made comprising two parts from two different alloys. Aluminium alloys 7449, 7040 and 2022 were cast and the composition obtained from these cast are provided in Table 5.

TABLE 5

Chemical compositions (weight percent)

| Element | Si | Fe | Cu | Mn | Mg | Zn | Ti | Zr |
|---|---|---|---|---|---|---|---|---|
| 7040 | 0.03 | 0.07 | 1.72 | — | 1.89 | 6.37 | 0.04 | 0.11 |
| 7449 | 0.05 | 0.07 | 1.94 | — | 2.15 | 8.50 | 0.03 | 0.11 |
| 2022 | 0.04 | 0.08 | 4.89 | 0.34 | 2.15 | — | 0.02 | — |

Ingots of 7040 and 7449 alloys were transformed as described in Example 1. The ingots of 2022 alloy were preheated at 475° C., hot rolled down to a thickness of 40 mm, solution heat treated at 530° C., quenched and stretched of 3%. This treatment resulted in a T351 temper. The resulting plates were then cut to the desired dimensions and the parts obtained received a pre-aging treatment of 16 h 173° C. resulting in a T851 temper. A first machining step was then carried in order to obtain 16 mm coupons ready for welding.

The tempers used before welding were aimed at obtaining the best properties of alloys once they had been welded and post-weld heat-treated. The combinations retained for the tests are presented in Table 6.

Welding conditions were the same as in Example 1. Again, as no visual defect was observed on the surface of the welds, and only the "100 mm/min" welds were characterized.

TABLE 6

Description of assemblies and post welding thermal treatment conditions

| Specimen reference | Intial alloy/temper | | Post weld heat treatment | Final alloy/temper | |
|---|---|---|---|---|---|
| | Advancing Side | Retreating Side | | Advancing Side | Retreating Side |
| D | 7449-W51 | 7040-W51 | 6 h 120° C. + 16 h 155° C. | 7449-T7951 | 7040-T7651 |
| E | 2022-T851 | 7040-W51 | 7 h 173° C. | 2022-T851 | 7040-T7651 |
| F | 7040-W51 | 2022-T851 | 7 h 173° C. | 7040-T7651 | 2022-T851 |

Although some defects were observed, all welds were tensile tested on specimens taken at mid thickness and perpendicular to the weld, as shown in FIGS. 5 and 6. The mechanical properties of the welded joints are provided in Table 7.

TABLE 7

Mechanical properties of the joints

| Specimen reference | YS (MPa) | UTS (MPa) | Ag % | A % |
|---|---|---|---|---|
| D | 275 | 367 | 2.21 | 2.70 |
| E | 230 | 353 | 4.14 | 4.94 |
| F | 249 | 371 | 4.27 | 5.22 |

An asymmetry appears in the results of the couple 2022/7040 depending on the alloy being in the advancing side. Indeed, if the 2022 alloy was placed in the retreating side, tensile properties were significantly lower than if the 2022 alloy was placed in the advancing side.

EXCO tests were carried out as described in Example 1. The results are provided in Table 8.

TABLE 8

Results of exfoliating corrosion tests

| Sample | Advancing side | | Nugget | Retreating side | |
|---|---|---|---|---|---|
| | Base Metal | HAZ | | HAZ | Base Metal |
| D | 7449-T7951 | | | 7040-T7651 | |
| | PF | EB | PF | PF/EA | PF |
| E | 7040-T7651 | | | 2022-T851 | |
| | EB/EC | EB/EC | P | P | P |
| F | 2022-T851 | | | 7040-T7651 | |
| | P | P | P | EB/EC | EB/EC |

These results show that the nugget had good performance in EXCO, quotations being P or PF in each case. Good performance is also observed for base metal, being PF except for 7040-T7651 in cases E and F when it is coupled with 2022 alloy. As far as the heat-affected zone is concerned, EB or EB/EC is typically obtained except for 7040-T7651 (PF/EA) in case D and 2022 (P) in cases E and F.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

The invention claimed is:

1. A structural member comprising at least two aluminum alloy parts, displaying different property balances, said at least two parts being welded and wherein one of said parts is selected from an initial temper different from the other of said at least two parts, and wherein at least one of said at least two parts has been pre-aged prior to being welded, and, further wherein said structural member has undergone a post-welding thermal treatment conferring a final temper to each of said at least two parts, and wherein at least one part is selected such that the final temper thereof is optimized to impart strength properties to said structural member, and at least another adjacent part is selected such that the final temper thereof is optimized to provide damage tolerance or resistance against stress corrosion and/or resistance against exfoliation corrosion to said structural member, wherein:

at least two of said at least two parts comprise a 7XXX alloy part, and a 7XXX alloy part with the highest ultimate tensile strength is placed on an advancing side of a stir friction weld; or at least one of said at least two parts comprises a 2XXX alloy part and another of said at least two parts comprises a 7XXX alloy part, and wherein the 2XXX alloy part is placed on an advancing side of a stir friction weld.

2. A structural member as claimed in claim 1, wherein said at least two parts are adjacent.

3. A structural member as claimed in claim 2, wherein said different property balances between said at least two parts is due to (i) the chemical composition of said parts, (ii) the initial tempers of said parts, and/or (iii) said post-welding thermal treatment.

4. A structural member according to claim 2, wherein at least one part is selected such that the chemical composition thereof and/or the final temper thereof imparts strength properties to said structural member, and at least another adjacent part is selected such that the chemical composition thereof and/or the final temper thereof provides damage tolerance to said structural member.

5. A structural member according to claim 2, wherein the post welding treatment highest temperature is from about 150° to about 200° C.

6. A structural member according to claim 2, wherein the post welding treatment highest temperature is from about 110° to about 180° C.

7. A structural member according to claim 2, wherein the post welding treatment highest temperature is from about 170° to about 180° C.

8. A structural member according to claim 2, wherein the post welding treatment highest temperature is from about 140° to about 160° C.

9. A structural member according to claim 2, wherein said structural member comprises a spar or a rib suitable for use in aircraft construction.

10. A structural member as claimed in claim 1, wherein said different property balances between said at least two parts is due to (i) the chemical composition of said parts, (ii) the initial tempers of said parts, and/or (iii) said post-welding thermal treatment.

11. A structural member according to claim 1, wherein at least two of said at least two parts comprise a 7XXX alloy part.

12. A structural member according to claim 11, wherein the post welding treatment highest temperature is from about 110° to about 180° C.

13. A structural member according to claim 11, wherein the post welding treatment highest temperature is from about 140° to about 160° C.

14. A structural member according to claim 11, wherein said structural member includes at least an upper part and a lower part, wherein said upper part comprises 7449 T79 or 7449 T7951 and said lower part comprises 7040 T76 or 7040 T7651 in a final temper.

15. A structural member according to claim 11, wherein said 7XXX alloy is selected from the group consisting of 7040, 7349 and 7449.

16. A structural member according to claim 11, wherein said 7XXX alloy part is pre-aged.

17. A structural member according to claim 1, wherein at least one of said at least two parts comprises a 2XXX alloy part and another of said at least two parts comprises a 7XXX alloy part.

18. A structural member according to claim 17, wherein said 7XXX alloy is selected from the group consisting of 7040, 7349 and 7449.

19. A structural member according to claim 17, wherein said 7XXX alloy part is pre-aged.

20. A structural member according to claim 17, wherein said 2XXX alloy part is pre-aged.

21. A structural member according to claim 17, wherein the post welding treatment highest temperature is from about 150° to about 200° C.

22. A structural member according to claim 17, wherein the post welding treatment highest temperature is from about 170° to about 180° C.

23. A structural member according to claim 1, wherein said structural member comprises a spar or a rib suitable for use in aircraft construction.

24. A method for manufacturing a structural member comprising at least two aluminum alloy parts displaying different property balances according to claim 1, comprising: welding said at least two parts and, subjecting said structural member to a post-welding thermal treatment conferring a final temper to each of said at least two parts, wherein said parts are welded by friction stir welding, and:
- at least two of said at least two parts comprise a 7XXX alloy part, and a 7XXX alloy part with the highest ultimate tensile strength is placed on an advancing side of a stir friction weld; or
- at least one of said at least two parts comprises a 2XXX alloy part and another of said at least two parts comprises a 7XXX alloy part, and wherein the 2XXX alloy part is placed on an advancing side of a stir friction weld.

25. A method according to claim 24, wherein said at least two parts are adjacent.

26. A method of claim 24, wherein said different property balances between said at least two parts are is due to (i) the chemical composition of said parts, (ii) the initial tempers of said parts, and/or (iii) the post-welding thermal treatment.

27. A method according to claim 24, wherein at least two of said at least two parts comprise a 7XXX alloy.

28. A method according claim 27, wherein said 7XXX alloy is selected from the group consisting of 7040, 7349 and 7449.

29. A method according to claim 27, wherein said 7XXX alloy is pre-aged.

30. A method according to claim 24, wherein at least one of said at least two parts comprises a 2XXX alloy and another of said at least two parts comprises a 7XXX alloy.

31. A method according to claim 30, wherein said 2XXX alloy part is pre-aged.

32. A method according to claim 24, wherein the post welding treatment highest temperature is from about 150° to about 200° C.

33. A method according to claim 24, wherein the post welding treatment highest temperature is from about 110° to about 180° C.

34. A method according to claim 24, wherein the post welding treatment highest temperature is from about 170° to about 180° C.

35. A method according to claim 24, wherein the post welding treatment highest temperature is from about 140° to about 160° C.

36. A method according to claim 24, wherein said structural member comprises a spar or a rib suitable for use in aircraft construction.

37. A method according to claim 24, wherein said structural member includes at least an upper part and a lower part, wherein said upper part comprises 7449 T79 or 7449 T7951 and said lower part comprises 7040 T76 or 7040 T7651 in a final temper.

* * * * *